(12) United States Patent
Sakamae

(10) Patent No.: US 11,435,303 B2
(45) Date of Patent: Sep. 6, 2022

(54) X-RAY ANALYSIS DEVICE AND PEAK SEARCH METHOD

(71) Applicant: Shimadzu Corporation, Kyoto (JP)

(72) Inventor: Hiroshi Sakamae, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 25 days.

(21) Appl. No.: 17/170,123

(22) Filed: Feb. 8, 2021

(65) Prior Publication Data

US 2021/0356413 A1 Nov. 18, 2021

(30) Foreign Application Priority Data

May 12, 2020 (JP) .............................. JP2020-083748

(51) Int. Cl.
*G01N 23/2252* (2018.01)
*G01N 23/20091* (2018.01)
*G01N 23/207* (2018.01)

(52) U.S. Cl.
CPC ..... *G01N 23/2252* (2013.01); *G01N 23/2076* (2013.01); *G01N 23/20091* (2013.01); *G01N 2223/079* (2013.01)

(58) Field of Classification Search
CPC ........... G01N 23/2252; G01N 23/2209; G01N 23/223; G01N 23/20091; G01N 23/2076; G01N 2223/079

USPC .................................................. 250/306, 307
See application file for complete search history.

(56) References Cited

U.S. PATENT DOCUMENTS 11,300,451 B2 * 4/2022 Matousek ............ A61B 5/7203

FOREIGN PATENT DOCUMENTS

JP H08-031367 A 2/1996

* cited by examiner

*Primary Examiner* — Kiet T Nguyen
(74) *Attorney, Agent, or Firm* — Muir Patent Law, PLLC

(57) ABSTRACT

The present invention provides an X-ray analysis device and a peak search method capable of realizing highly accurate peak searches without significantly increasing a processing time. Peak search processing includes: a step (S220) for acquiring a profile of a spectrum; a step (S240) for narrowing down a wavelength range where a true value of a peak wavelength (peak intensity) may be present, taking into account statistical fluctuation of a measured value; a step (S250) for measuring the intensity of the X-rays at the long wavelength end, the short wavelength end, and the intermediate wavelength in the narrowed wavelength range; a step (S255) for calculating a quadratic function passing through the respective measured values in the above-described three wavelengths; and a step (S260) for calculating the wavelength of the vertex of the calculated quadratic function as the peak wavelength.

10 Claims, 10 Drawing Sheets

X-RAY ANALYSIS DEVICE AND PEAK SEARCH METHOD

CROSS-REFERENCE TO RELATED APPLICATIONS

This application claims priority under 35 U.S.C. § 119 to Japanese Patent Application No. 2020-083748 filed on May 12, 2020, the entire disclosure of which is incorporated herein by reference in its entirety.

TECHNICAL FIELD

The present disclosure relates to an X-ray analysis device and a peak search method.

BACKGROUND ART

In an X-ray analysis device, such as, e.g., an electron probe microanalyzer (EPMA: Electron Probe Micro Analyzer) and a fluorescent X-ray analysis device, a device provided with a wavelength dispersive spectrometer (WDS: Wavelength Dispersive Spectrometer) is known.

In Japanese Unexamined Patent Application Publication No. H8-31367 (Patent Document 1), in an X-ray analysis device provided with a wavelength dispersive spectrometer, a peak search method is disclosed in which a wavelength at which the intensity (count value of characteristic X-rays by a detector) in a spectrum of the characteristic X-rays diffracted using a spectrometer becomes maximum (hereinafter, the wavelength is referred to as "peak wavelength", and the intensity at the peak wavelength is referred to as "peak intensity") can be accurately and easily determined (see Patent Document 1).

PRIOR ART DOCUMENT

Patent Document
Patent Document 1: Japanese Unexamined Patent Application Publication No. H8-31367

SUMMARY OF THE INVENTION

Problems to be Solved by the Invention

By accurately determining a peak wavelength from a profile of a spectrum of characteristic X-rays diffracted by a spectrometer (hereinafter sometimes simply referred to as "profile"), for example, the accuracy of the "quantitative analysis" for measuring a concentration of an element in a sample can be enhanced. In a quantitative analysis, in order to measure a concentration of a target element, the peak intensity is measured using a standard sample whose concentration of the element is known, and then the peak intensity is measured under the same measurement condition for a sample whose concentration of the element is unknown. Then, the concentration of the element in the sample is measured by their intensity ratio.

A profile acquired using a wavelength dispersive spectrometer has a characteristic that the peak is steep and does not overlap with the peaks of other characteristic X-rays as compared with a profile acquired using the energy-dispersive spectrometer (EDS: Energy Dispersive Spectrometer). On the other hand, the profile is susceptible to a shift of a wavelength depending on the reproducibility (operation of the goniometer) of a spectrometer, the shift of a wavelength depending on the chemical bonding states of the element, or the like. Therefore, in an X-ray analysis device equipped with a wavelength dispersive spectrometer, it is generally performed to scan the spectral wavelength in the vicinity of the assumed peak wavelength according to the target element and then perform the "peak search" to accurately identify the peak wavelength from the resulting profile to match the spectral wavelength.

In the peak search, by measuring characteristic X-rays by a predetermined time while activating the spectrometer so that the wavelength of the detected characteristic X-rays changes at predetermined intervals, the scan processing for acquiring the profile in the vicinity of the peak wavelength is performed. As an example, a scanning range is set to several times (e.g., 3 to 4 times) the half-width of the expected profile, and the scanning range is divided into about 40 points, each point is measured for 0.75 seconds, and a total scan processing of about 30 seconds is performed.

Then, a quantitative analysis is performed by determining the wavelength that peaks in the profile acquired by the scanning processing, adjusting the spectral wavelength to that wavelength, and then measuring the intensity of the characteristic X-rays for a counting time of, for example, 10 seconds.

However, statistical fluctuation (variation) of the X-ray intensity to be measured (variations) may distort the shape of the profile acquired in the peak search. If the shape of the profile is distorted, the peak wavelength may be erroneously determined. If the measurement is performed at the spectral wavelength deviated from the true peak wavelength, an error occurs in the peak intensity, causing errors in the density measurement result.

Specifically, according to the above-described measurement condition, the counting time for acquiring the peak intensity of the target characteristic X-rays in the quantitative analysis is 10 seconds, while the profile for acquiring the peak wavelength used in the quantitative analysis is acquired for the counting time of 0.75 seconds at each point. The X-ray intensity of the two is equivalent to the count rate (count value per unit time, sometimes referred to as "cps"), but the values are different, so the statistical fluctuation sizes of the two are different.

Statistically, the error of the measured X-ray intensity is given by $\sigma=\sqrt{N}$ ($\sigma$ is a standard deviation, and N is a count value). Therefore, if the count rate of the intensity of the target characteristic X-rays is 3000 cps, when the counting time is 10 seconds, the count value is 30000 counts so the error of the measured X-ray intensity becomes 30000=173 counts, that is, 0.58%. On the other hand, when the counting time is 0.75 seconds, since the count value is 2250 counts, the error of the X-ray intensity to be measured is 2.11% at $\sqrt{2250}$=47.4 counts. That is, in this case, the statistical fluctuation at the time of acquiring the profile is 3.65 times larger than the statistical fluctuation at the time of the quantitative analysis.

The statistical fluctuation of the count value at the time of acquiring the profile is a factor that distorts the profile form and prevents the accurate peak wavelength from being acquired. In order to eliminate this effect, it is conceivable to match the counting time of each point in the peak search processing with the counting time of the quantitative analysis. However, if the counting time of each point in the peak search processing is set to, for example, 10 seconds, provided that the scanning range of the peak search is 40 points, it takes as long as 400 seconds to acquire the profile. It is also conceivable that the scanning range is narrowed by an amount corresponding to the extension of the counting time, but there is a possibility that the peak does not fit in the scanning range, resulting in a failure of the peak search.

The present disclosure has been made to solve the above problems, and an object of the present disclosure is to provide an X-ray analysis device and a peak search method capable of realizing highly accurate peak searching without greatly increasing the processing time.

Means for Solving the Problem

An X-ray analysis device according to the present disclosure is provided with a wavelength dispersive spectrometer and a processing unit configured to perform peak search processing for detecting a peak wavelength of a spectrum of characteristic X-rays to be diffracted using a spectrometer. The peak search processing includes first processing to sixth processing. The first processing is processing for acquiring a profile of the spectrum by measuring the characteristic X-rays by a time shorter than a counting time when measuring peak intensity of the characteristic X-rays, while actuating the spectrometer so that a wavelength of the characteristic X-rays changes at predetermined intervals. The second processing is processing for calculating a minimum value of a value that a true value of the peak intensity can take, from an intensity value of data indicating maximum intensity in the acquired profile and a statistical fluctuation of a measured value. The third processing is processing for calculating a minimum measured value that a measured value of the peak intensity can take by the statistical fluctuation of the measured value when the true value of the peak intensity is the minimum value. The fourth processing is processing for measuring the intensity of the characteristic X-rays for the counting time which is same as for measuring peak intensity, at the long and short end of the wavelength range in which the measured value in the acquired profile is larger than the minimum measured value, and at an intermediate wavelength between the long and short ends. The fifth processing is processing for calculating a quadratic function passing through each measured value of the long wavelength end, the short wavelength end, and the intermediate wavelength. The sixth processing is processing for calculating a wavelength of a vertex of the calculated quadratic function as the peak wavelength.

Further, a peak search method according to the present disclosure is a peak search method for detecting a peak wavelength of a spectrum of characteristic X-rays to be dispersed using a wavelength dispersive spectrometer. The peak search method includes a first step to a sixth step. The first step is a step of acquiring a profile of the spectrum by measuring the characteristic X-rays by a time shorter than a counting time when measuring peak intensity of the characteristic X-rays, while actuating the spectrometer so that a wavelength of the characteristic X-rays changes at predetermined intervals. The second step is a step of calculating a minimum value of a value that a true value of the peak intensity can take, from an intensity value of data indicating maximum intensity in the acquired profile and a statistical fluctuation of a measured value. The third step is a step of calculating a minimum measured value that a measured value of the peak intensity can take by the statistical fluctuation of the measured value when the true value of the peak intensity is the minimum value. The fourth step is a step of measuring the intensity of the characteristic X-rays for the counting time which is same as for measuring peak intensity, at the long and short end of the wavelength range in which the measured value in the acquired profile is larger than the minimum measured value, and at an intermediate wavelength between the long and short ends. The fifth step is a step of calculating a quadratic function passing through each measured value of the long wavelength end, the short wavelength end, and the intermediate wavelength. The sixth step is a step of calculating a wavelength of a vertex of the calculated quadratic function as the peak wavelength.

Effects of the Invention

In the above-described X-ray analysis device and peak search method, the wavelength range where a true value of a peak intensity may be present is narrowed down by considering a statistical fluctuation of the measured value. Thus, considering the statistical fluctuation of the measured value, it is possible to reasonably narrow down the wavelength range where the true value of the peak intensity may be present. Then, the intensity of the characteristic X-rays is measured at the long wavelength end, the short wavelength end, and the intermediate wavelength between them of the narrowed-down wavelength range, the peak wavelength is calculated from the quadratic function passing through the respective measurement points. As a result, a highly accurate peak search can be realized without significantly increasing the processing time.

EMBODIMENTS FOR CARRYING OUT THE INVENTION

Figure 1:
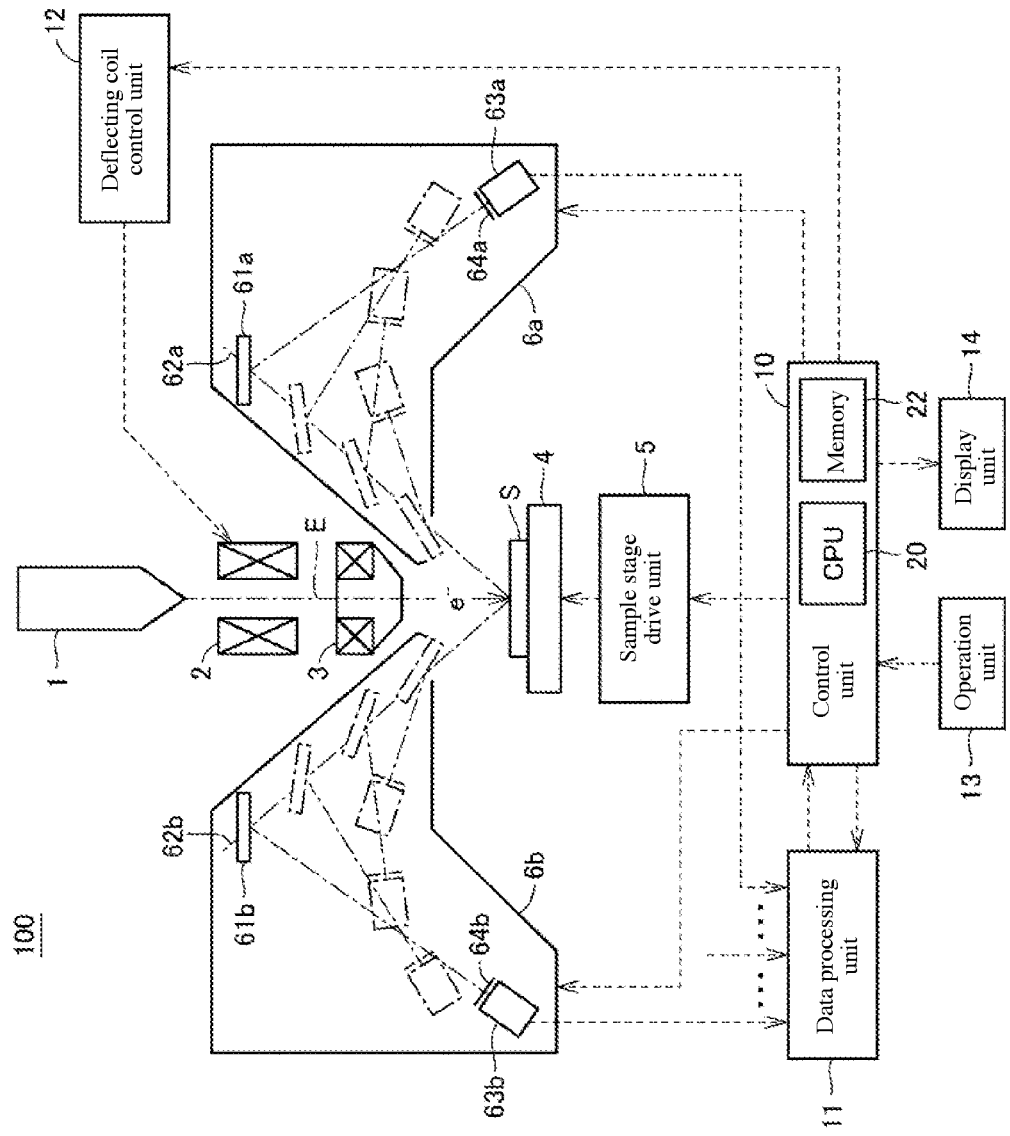
FIG. 1 is a diagram showing an entire configuration of an EPMA which is an example of an X-ray analysis device according to Embodiment 1.

Hereinafter, some embodiments of the present disclosure will be described in detail with reference to the attached drawings. In the drawings, the same or corresponding portion is denoted by the same reference numeral, and the description thereof will not be repeated.

Embodiment 1

<Configuration of X-Ray Analysis Device>

FIG. 1 is an entire configuration diagram of an EPMA 100 which is an exemplary X-ray analysis device according to Embodiment 1 of the present disclosure. It should be noted that the X-ray analysis device according to the present disclosure is not limited to an EPMA 100 in which a sample is irradiated with an electron beam, and may be a fluorescent X-ray analysis device in which a sample is irradiated with X-rays and the characteristic X-rays is diffracted by a WDS.

Referring to FIG. 1, the EPMA 100 is provided with an electron gun 1, a deflecting coil 2, an object lens 3, a sample stage 4, a sample stage drive unit 5, and a plurality of spectrometers 6a and 6b. The EPMA 100 is further provided with a control unit 10, a data processing unit 11, a deflecting coil control unit 12, an operation unit 13, and a display unit 14. The electron gun 1, the deflecting coil 2, the object lens 3, the sample stage 4, and the spectrometers 6a and 6b are provided in a measurement chamber (not shown), during the measurement of X-rays, and the measurement chamber is evacuated into a vacuum condition.

The electron gun 1 is an excitation source for generating an electron beam E to be emitted to the sample S on the sample stage 4, and it is possible to adjust the beam current of the electron beam E by controlling the converging lens (not shown). The deflecting coil 2 forms a magnetic field by a drive current supplied from the deflecting coil control unit 12. By the magnetic field formed by the deflecting coil 2, it is possible to deflect the electron beam E.

The object lens 3 is provided between the deflecting coil 2 and the sample S to be placed on the sample stage 4 and narrows the electron beam E passing through the deflecting coil 2 to a small diameter. The electron gun 1, the deflecting coil 2, and the object lens 3 constitute an irradiation device for emitting an electron beam toward the sample. The sample stage 4 is a stage for placing a sample S, and is configured to be movable in a horizontal plane by the sample stage drive unit 5.

By driving the sample stage 4 by the sample stage drive unit 5 and/or driving the deflecting coil 2 by the deflecting coil control unit 12, it is possible to scan the irradiated position of the electron beam E on the sample S two-dimensionally. When the scanning range is relatively narrow, the scanning by the deflecting coil 2 is performed, and when the scanning range is relatively wide, the scanning by the moving of the sample stage 4 is performed.

The spectrometers 6a and 6b are devices for detecting characteristic X-rays emitted from the sample S irradiated with the electron beam E. In this example, two spectrometers 6a and 6b are shown, but the number of spectrometers is not limited thereto, and may be one or three or more. The configuration of each spectrometer is the same except for analyzing crystals, and in the following description, each spectrometer may be referred to simply as "spectrometer 6".

The spectrometer 6a is composed of a analyzing crystal 61a, a detector 63a, and a slit 64a. The irradiation position of the electron beam E on the sample S, the analyzing crystal 61a, and the detector 63a are located on the Rowland circle (not shown). By a drive mechanism (not shown), the analyzing crystal 61a is inclined while moving on a straight line 62a, and the detector 63a is rotated as shown in accordance with the movement of the analyzing crystal 61a so that the incident angle of characteristic X-rays with respect to the analyzing crystal 61a and the outgoing angle of the diffracted X-ray satisfy the Bragg's diffractive condition. As a result, the wavelength scanning of the characteristic X-rays emitted from the sample S can be performed.

The spectrometer 6b is composed of a analyzing crystal 61b, a detector 63b, and a slit 64b. Since the configuration of the spectrometer 6b is the same as that of the spectrometer 6a except for the analyzing crystal, the explanation thereof will not be repeated. The configuration of each spectrometer is not limited to the above-described configuration, and various known configurations can be employed.

The control unit 10 includes a CPU (Central Processing Unit) 20, a memory (ROM (Read Only Memory) and a RAM (Random Access Memory)) 22, and an input/output buffer (not shown) for inputting and outputting various signals. The CPU expands the program stored in the ROM to the RAM or the like and runs the program. The program stored in the ROM is a program that describes the processing procedure of the control unit 10. The ROM also stores various tables (maps) used in various operations. The control unit 10 executes various types of processing in the EPMA 100 in accordance with these programs and tables. Processing is not limited to software-based processing, but can be implemented by a dedicated hardware (electronic circuits).

The data processing unit 11 is also composed of a CPU, memories (ROMs and RAMs), and an input/output buffer for inputting and outputting various signals (neither of them is shown). The data processing unit 11 generates an X-ray spectrum of the analysis target and performs a qualitative analysis based thereon. Further, the data processing unit 11 performs a peak search of characteristic X-rays corresponding to the element with respect to a standard sample containing the element to be measured and an unknown sample, and performs a quantitative analysis based on this. The data processing unit 11 may be configured integrally with the control unit 10.

The deflecting coil control unit 12 controls the drive current supplied to the deflecting coil 2 in accordance with the instruction from the control unit 10. By controlling the drive current according to a predetermined drive current pattern (magnitude and change speed), the irradiated position of the electron beam E on the sample S can be scanned at a desired scan speed.

The operation unit 13 is an inputting device for the analyst to give various instructions to the EPMA 100, and is configured by, for example, a mouse, a keyboard, and the like. The display unit 14 is an outputting device for providing various kinds of data to the analyst, and is configured by, for example, a display having a touch panel that can be operated by the analyst. The touch panel may be the operation unit 13.

<Method of Quantitative Analysis>

In the quantitative analysis, the concentration of the element of interest (hereinafter referred to as "target element") in the sample is measured. In the quantitative analysis, in order to measure the concentration of the target element, the intensity (peak intensity) at the peak position (peak wavelength) of the characteristic X-rays corresponding to the target element is measured using a reference sample whose concentration of the target element is known, and then the peak intensity is measured under the same measuring conditions for the sample whose concentration of the target element is unknown. The concentration of the target element in the sample is measured by their intensity ratio.

Therefore, the accuracy of the quantitative analysis can be enhanced by accurately acquiring the peak wavelength of the characteristic X-rays corresponding to the target element for each of the standard sample and the unknown sample. In the X-ray analysis device equipped with the wavelength dispersive spectrometer, the spectral wavelength is scanned in the vicinity of the peak wavelength assumed according to the target element, and the "peak search" in which the peak wavelength is accurately identified from the resulting profile is performed.

Figure 2:
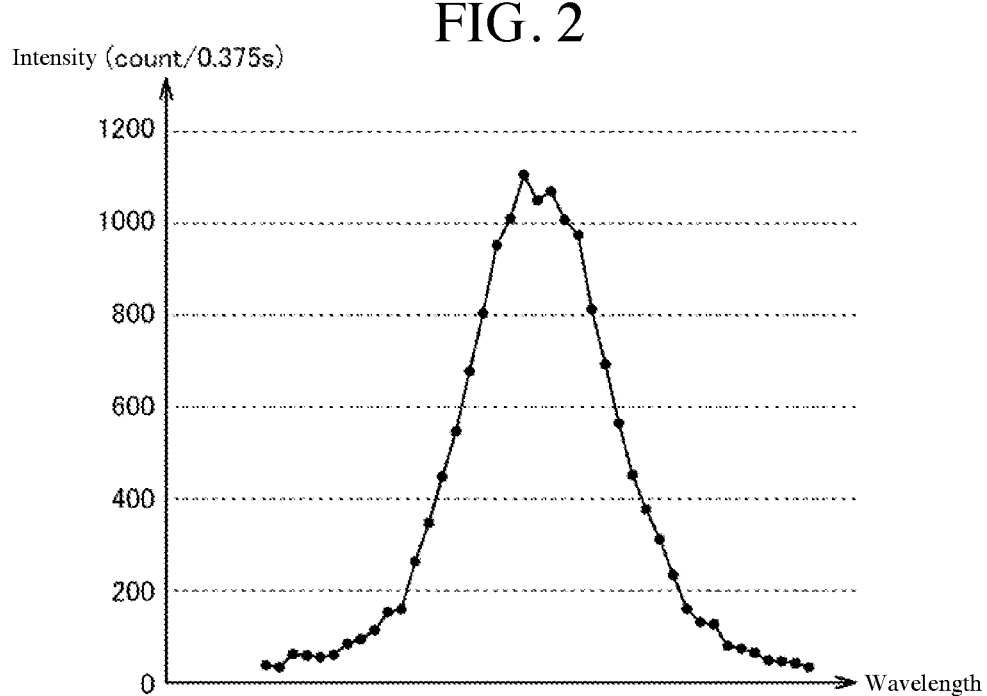
FIG. 2 shows an example of a profile of characteristic X-rays.

FIG. 2 shows an example of a profile of the measured characteristic X-rays. In FIG. 2, the horizontal axis indicates the wavelength (spectral wavelength) of the characteristic X-rays to be detected, and the vertical axis indicates the intensity (counted value for the counting time of 0.375 seconds) of the detected characteristic X-rays.

Referring to FIG. 2, the profile qualitatively has a form close to a normal distribution. The points on the curve indicate measured values. That is, in the peak search, by measuring characteristic X-rays by a predetermined time while activating the spectrometer so that the wavelength of the detected characteristic X-rays changes at predetermined intervals, the scan processing for acquiring the profile as shown in the figure is performed.

In this example, the scanning range is set to several times (e.g., 3 to 4 times) the half-width of the profile expected from historical data or the like, and the scanning range is divided into about 40 points to measure each point for 0.375 seconds, and a total scan processing of about 15 seconds is performed.

Since the counting time of each point is as short as 0.375 seconds from the viewpoint of shortening the processing period, each measured value (intensity) forming the profile contains a statistical fluctuation (error). Thus, as shown, the resulting profile is distorted. If the profile shape is distorted, the peak wavelength may be erroneously determined. If the measurement is performed in the spectral wavelength deviated from the true peak wavelength, an error occurs in the peak intensity, causing an error in the density measurement result.

Therefore, in the first embodiment, considering the statistical fluctuation of the measured value, narrowing down the wavelength range where a true value of the peak intensity may be present is performed. With this, considering the statistical fluctuation of the measured value, it is possible to reasonably narrow down the wavelength range where the true value of the peak intensity may be present. Then, the intensity of the characteristic X-rays is measured at the long wavelength end, the short wavelength end of the narrowed wavelength range and at the intermediate wavelength (e.g., median value) between them, and the peak wavelength is calculated from the quadratic function passing through each measurement point. With this, a highly accurate peak search can be realized without significantly increasing the processing time. Hereinafter, the peak search method in Embodiment 1 will be described in detail.

Figure 3:
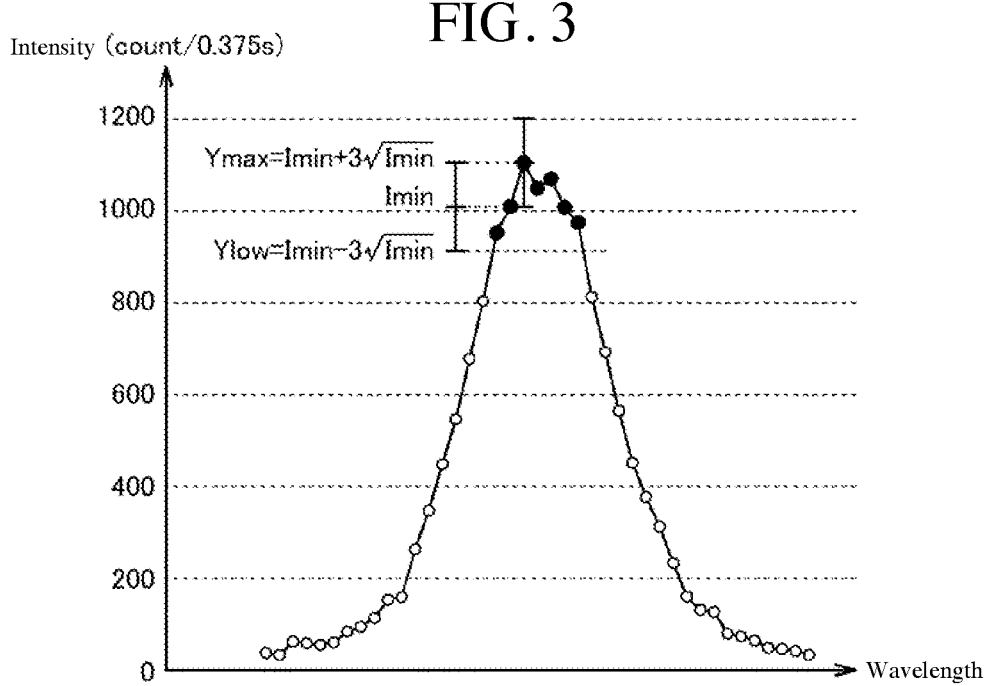
FIG. 3 is a diagram for explaining the concept of narrowing down a wavelength range in which a true value of a peak wavelength may be present.

FIG. 3 is a diagram for explaining the concept of narrowing down the wavelength range where the true value of the peak wavelength may be present. FIG. 3 shows the same profile data as the data shown in FIG. 2.

Referring to FIG. 3, in the EPMA 100 according to Embodiment 1, from the maximum intensity Ymax in the acquired profile, considering the statistical fluctuation of the measured value, the wavelength range where the true value of the peak intensity may be present is determined.

When the true peak intensity is I, the maximum intensity Ymax is considered to be within the range of the error due to the statistical fluctuation of the measured value of the intensity I. That is, considering the statistical fluctuation at $3\sigma$, the maximum intensity Ymax can be present in the following range for the true peak intensity I.

$$I-3\sqrt{I} \leq Y\text{max} \leq I+3\sqrt{I} \quad (1)$$

Therefore, for the maximum intensity Ymax, the minimum value Imin that the true peak intensity I can take can be obtained as a value satisfying the following formula.

$$I\text{min}+3\sqrt{I\text{min}}=Y\text{max} \quad (2)$$

Assuming that the true peak intensity I is Imin, the minimum value Ylow (minimal measured value) of the intensity that can be measured when the true peak intensity I is Imin is given by the following formula since the statistical fluctuation must also be considered for that measurement.

$$Y\text{low}=I\text{min}-3\sqrt{I\text{min}} \quad (3)$$

Thus, in the acquired profile, the point (black point) where the intensity is included in the wavelength range larger than the Ylow may be the result of measuring the true peak intensity I. In other words, the range where the true peak intensity I may be present can be narrowed down to the wavelength range where the intensity is greater than Ylow.

Next, the method of calculating the peak wavelength and the peak intensity after narrowing down the wavelength range where a true peak intensity may be present is described.

Figure 4:
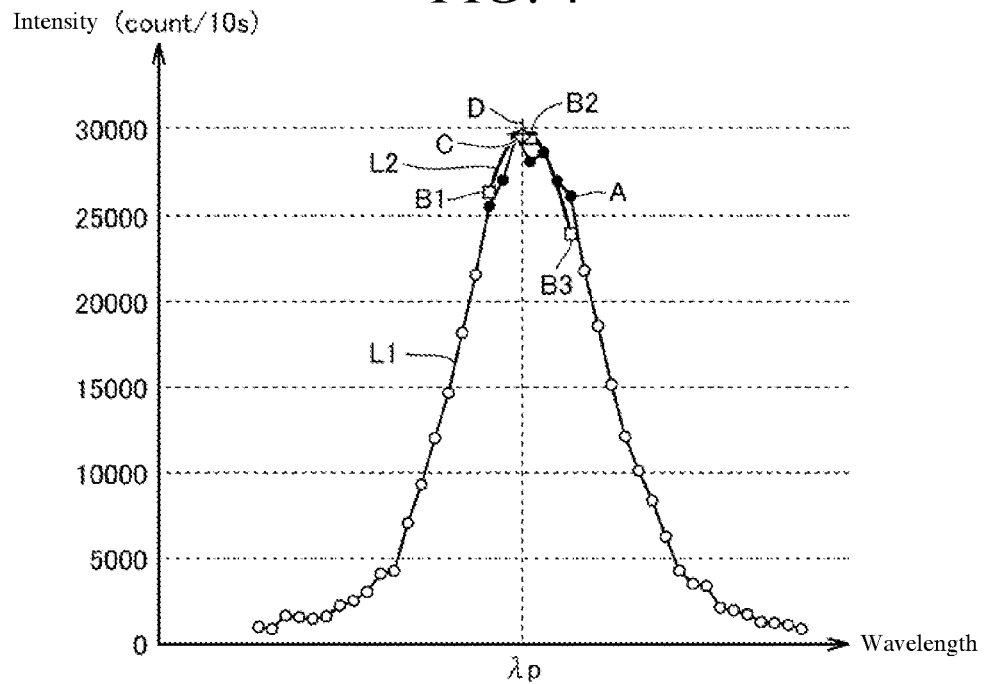
FIG. 4 is a diagram for explaining a calculation method of the peak wavelength and the peak intensity.

FIG. 4 is a diagram for explaining the calculation method of the peak wavelength and the peak intensity. Note that, in FIG. 4, in order to align the display for the measured values of different counting times, the profile data shown in FIG. 2 and FIG. 3 is shown by converting to the counted value per 10 seconds.

Referring to FIG. 4, in the EPMA 100 according to Embodiment 1, the intensity is measured at the same counting time as the counting time (10 seconds) in measuring the peak intensity at both ends (long wavelength end and short wavelength end) of the wavelength range (FIG. 3) where a true peak intensity may be present and the intermediate wavelength between them. In practice, the measurement is performed discretely with respect to the wavelength, and therefore the intensity measurement is performed at the point on the long wavelength end side, the point on the short wavelength end side of the wavelength range, and at one point between them (points B1 to B3).

Note that, in this embodiment, the above-described intermediate wavelength is a median value between the long wavelength end and the short wavelength end in the above-described wavelength range (actually, the median value between the wavelength of the point on the long wavelength end side and the wavelength of the point on the short wavelength end side). Then, the quadratic function L2 passing through the three measured measured values (points B1 to B3) is calculated.

$$y=ax^2+bx+c \quad (4)$$

Here, x and y are the spectral wavelength and the signal intensity of the X-rays, respectively, and a, b, c are coefficients.

Next, the calculated peak position (wavelength) $\lambda p$ of the quadratic function L2 and the intensity Ip at the peak position $\lambda p$ are calculated by the following formula.

$$\lambda p=-b/(2a), Ip=c-b^2/(4a) \quad (5)$$

In the figure, the point C indicated by a diamond mark indicates the peak of the calculated quadratic function L2. In Embodiment 1, the peak position (wavelength) λp of the quadratic function L2 is the peak wavelength, and the intensity Ip at the peak position (wavelength) λp is the peak intensity.

In a case where the count rate of the intensity of the target characteristic X-rays is 3000 cps, the error of the measured X-ray intensity is 0.58% at √30000=173 counts because the count value in the vicinity of the peak is about 30000 counts when the counting time is 10 seconds. Therefore, the peak intensity calculated from the quadratic function passing through the three points in the vicinity of the peak (long wavelength end, short wavelength end, and intermediate wavelength) can also be expected to have the same degree of accuracy. As for the sum of the measurement times by this method, it takes 0.375 seconds×40 points=15 seconds to acquire the profile, and 10 seconds×3 points=30 seconds to measure the intensity of the three points in the vicinity of the peak. Therefore, the total time is 45 seconds.

On the other hand, according to a typical conventional method, it takes 0.75 sec×40 points=30 seconds to acquire the profile, and it takes 10 seconds to measure the peak intensity, thus totaling 40 seconds. Since the peak wavelength is detected from the above-described profile and the intensity of the peak in this case is about 2,250 counts, the error of the measured X-ray intensity is 2.11% at √2,250=173 counts. Because this error results in an error of the peak wavelength, the measured result of the peak intensity reading has an error (2.11%), which is about the same as when the profile was acquired.

As described above, according to Embodiment 1, it is possible to realize a peak search with high accuracy in the same or similar total measurement time as compared with the above-described typical conventional method.

Note that, in the figure, the point D indicated by + mark indicates the actual measurement result of the intensity of characteristic X-rays in the calculated peak wavelength λp. As shown in the figure, the intensity Ip of the peak of the quadratic function L2 is equivalent to the actual measurement result of the intensity in the peak wavelength λp, and it is understood that the peak intensity can be calculated with high accuracy even in the quadratic function L2.

Figure 5:
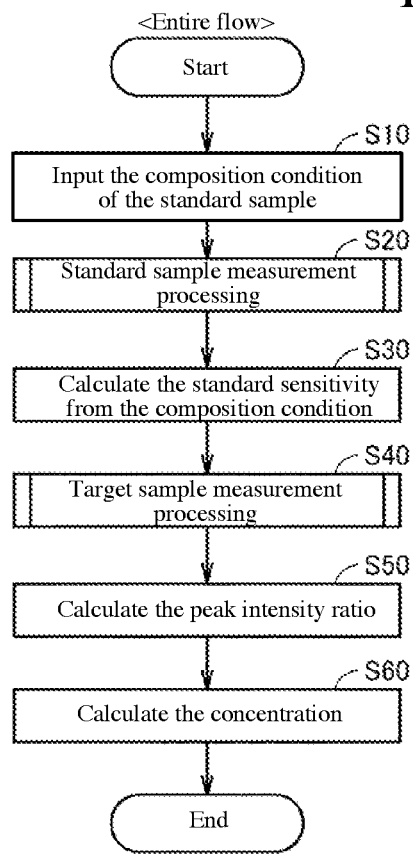
FIG. 5 is a flowchart showing an example of a procedure for a quantitative analysis using an EPMA according to Embodiment 1.

FIG. 5 is a flowchart illustrating an exemplary procedure for the quantitative analysis using the EPMA 100 according to Embodiment 1. Referring to FIG. 5, first, the composition condition of the standard sample whose composition is known (such as the weight percentage of the target element in the standard sample) is input (Step S10). This compositional condition may be input by the user from the operation unit 13, or may be stored in advance in the memory based on the result of the assessment test or the like in advance.

Next, the data processing unit 11 executes the standard sample measurement processing for measuring the characteristic X-rays corresponding to the target element with respect to the standard sample to which the compositional condition is input (Step S20). The details of the measurement processing executed here will be described later in detail.

In the standard sample measurement processing of Step S20, the peak intensity of the characteristic X-rays corresponding to the target element is measured for the standard sample. Then, the data processing unit 11 corrects the intensity of the measured characteristic X-rays by considering the compositional condition input in Step S10 to calculate the normal sensitivity for the target element (Step S30).

Next, the data processing unit 11 performs the object sample measurement processing for measuring the characteristic X-rays corresponding to the target element on the unknown sample containing the target element (hereinafter, referred to as "target sample") (Step S40). The procedure of the measurement processing executed here is the same as the procedure of the standard sample measurement processing of Step S20, and will be described in detail later.

In the object sample measurement processing of Step S40, the peak intensity of the characteristic X-rays corresponding to the target element is measured for the object sample. Next, the data processing unit 11 calculates the ratio (intensity ratio) of the peak intensity for the target sample calculated in Step S40 to the peak intensity for the normal sample calculated in Step S20 (Step S50). Then, the data processing unit 11 calculates the concentration of the target element in the target sample from the intensity ratio calculated in Step S50 (Step S60).

Figure 6:
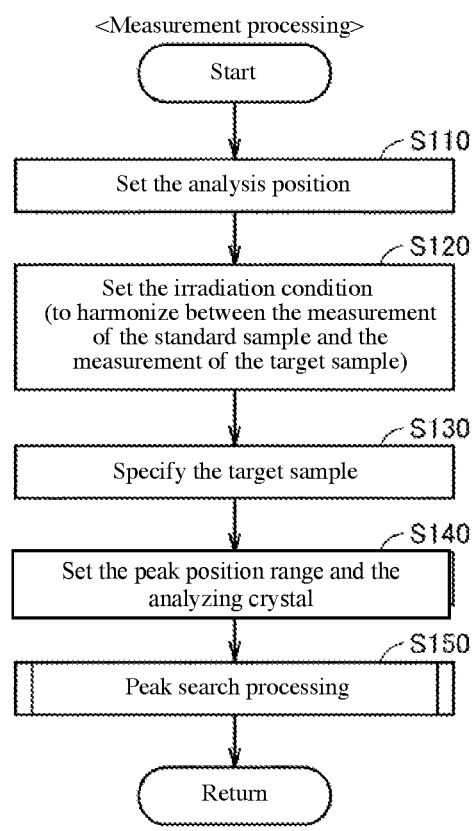
FIG. 6 is a flowchart showing an example of a procedure of the measurement processing executed in Step S20 and Step S40 of FIG. 5.

FIG. 6 is a flowchart showing an exemplary procedure of the measurement processing executed in Step S20 and Step S40 of FIG. 5. Referring to FIG. 6, first, the analyzing position on the sample is set (Step S110). Next, the electron-beam irradiation condition by the electron-beam irradiation device (the electron gun 1, the deflecting coil 2, the object lens 3) is set (Step S120). Here, the irradiation condition in the normal sample measurement processing in Step S20 of FIG. 5 and the irradiation condition in the target sample measurement processing in Step S40 are set to the same condition.

Then, the target element is specified (Step S130). The target element can be specified by the user from the operation unit 13. A plurality of target elements can be specified. When the target element is specified, the data processing unit 11 sets the range of the peak position (wavelength) of the characteristic X-rays corresponding to the specified target element, and sets the analyzing crystal suitable for the target element (wavelength of the characteristic X-rays corresponding to the target element) (Step S140). Note that, the relation between the element and the range of the peak position (wavelength) of the characteristic X-rays, and the relation between the element (wavelength of the characteristic X-rays corresponding to the element) and the analyzing crystal is stored in the memory is previously specified.

When the above-described various settings are completed, the data processing unit 11 executes the peak search processing (Step S150).

Figure 7:
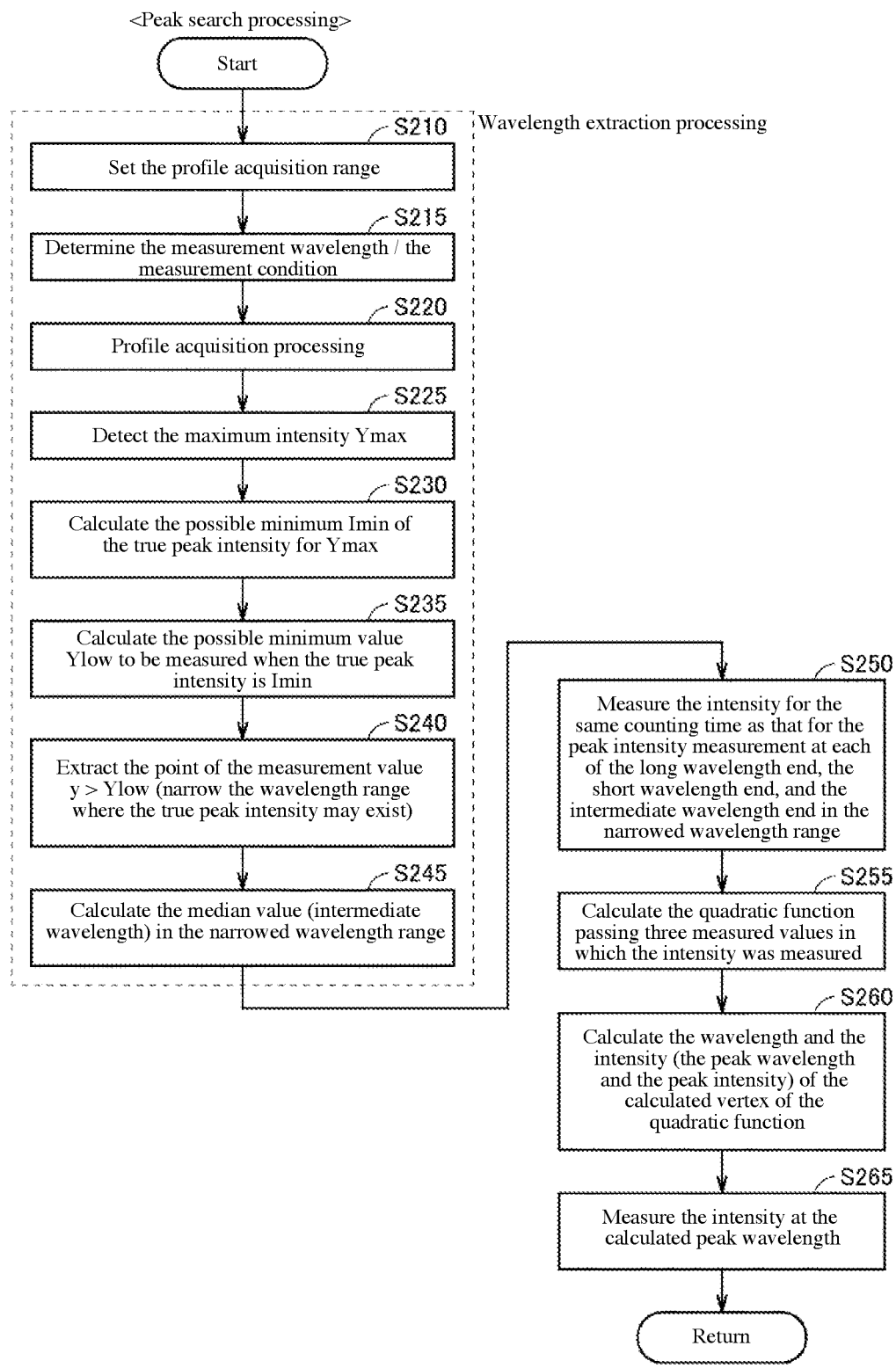
FIG. 7 is a flowchart showing an example of a procedure of the peak search processing executed in Step S150 of FIG. 6.

FIG. 7 is a flowchart showing an exemplary procedure of the peak search processing executed in Step S150 of FIG. 6. Referring to FIG. 7 together with FIG. 3 and FIG. 4, the data processing unit 11 sets the range for acquiring the profile by the scanning processing (Step S210). This range can be set to, for example, several times the half-width of the profile expected from historical data.

Next, the data processing unit 11 determines the measurement wavelength and the measurement condition of the scanning processing (Step S215). In this embodiment, the measurement wavelength (spectral wavelength) is determined so that the scanning range set in Step S210 is divided into 40 points, and the measurement time at each wavelength is set to 0.375 seconds. Then, the data processing unit 11 executes the profile acquiring processing for acquiring the profile by executing the scanning processing according to the set measurement wavelength and measurement condition (Step S220).

When the profile is acquired, the data processing unit 11 detects the maximum intensity Ymax in the acquired profile (Step S225). Specifically, the data processing unit 11 detects, as the maximum intensity Ymax, the data having the largest intensity of the 40 measured values.

Next, the data processing unit 11 calculates the minimum value Imin that the true peak intensity I can take for the maximum intensity Ymax using the above-described formula (2) (Step S230). Further, the data processing unit 11 uses the above-described formula (3) to calculate the minimum value Ylow (minimum measured value) of the intensity that can be measured when the true peak intensity I is Imin (Step S235).

When the minimum measured value Ylow is calculated, the data processing unit 11 extracts the point where the measured value Y of the intensity is larger than the minimum value Ylow in the profile acquired in Step S220 (a point where Y>Ylow is satisfied) (Step S240). That is, based on the minimum measured value Ylow, the wavelength range where the true peak intensity I may be present is narrowed down.

Next, the data processing unit 11 calculates the median value (intermediate wavelength) in the wavelength range narrowed down in Step S240 (Step S245). Note that, in practice, the median value between the wavelength of the point on the long wavelength end side and the wavelength of the point on the short wavelength end side in the wavelength range is calculated.

Note that a series of processing (Step S210 to S245) that determines the wavelength range where the true peak intensity I may be present and determine the intermediate wavelength contained in the wavelength range will be referred to below as "wavelength extract processing".

Subsequently, the data processing unit 11 sets the measurement wavelength and the measurement condition so that the intensity measurement is performed for the same counting time as the counting time (10 seconds) in measuring the peak intensity in each of the long wavelength end, the short wavelength end, and the intermediate wavelength in the wavelength range narrowed down in Step S240. Then, the intensity is measured in the three wavelengths according to the set measurement wavelength and measurement condition (Step S250).

Next, the data processing unit 11 calculates the quadratic function passing through the three measured values for which the intensity was measured in Step S250 using the above-described formula (4) (Step S255). The data processing unit 11 calculates the wavelength $\lambda p$ of the vertex of the calculated quadratic function and the intensity Ip at the wavelength $\lambda p$, using the above-described formula (5) (Step S260). In Embodiment 1, the wavelength $\lambda p$ calculated here is the peak wavelength, and the intensity Ip at the wavelength $\lambda p$ is the peak intensity.

Note that in this embodiment, after the wavelength $\lambda p$ and the intensity Ip of the vertex of the quadratic function are calculated in Step S260, the intensity measurement is performed in the calculated wavelength $\lambda p$ (peak wavelength) under the measurement condition (counting time 10 seconds) in Step S250 (Step S265). The processing in Step S265 is not essential, but instead of the peak intensity calculated in Step S260, the intensity measured in Step S265 may be the peak intensity. Note that, in this case, only by the amount to actually measure the intensity in the peak wavelength (10 seconds in the above example), the total measurement time becomes longer.

In the above-described description, the intermediate wavelength between both ends (long wavelength end and short wavelength end) in the wavelength range where the true peak intensity may be present is defined as the median value in the wavelength range, but the intermediate wavelength is not limited to the median value in the wavelength range. For example, the intermediate wavelength may be the wavelength of the maximum intensity Ymax.

As described above, in Embodiment 1, considering the statistical fluctuation of the measured value, the wavelength range where the true value of the peak intensity may be present can be narrowed down. Thus, considering the statistical fluctuation of the measured value, it is possible to reasonably narrow down the wavelength range where the true value of the peak intensity may be present. Then, the intensity of the characteristic X-rays is measured at the long wavelength end and the short wavelength end of the narrowed wavelength range and their median value (intermediate wavelength), and the peak wavelength is calculated from the quadratic function L2 passing through the respective measurement points. With such a method, a highly accurate peak search can be realized without significantly increasing the processing time.

Embodiment 2

Figure 8:
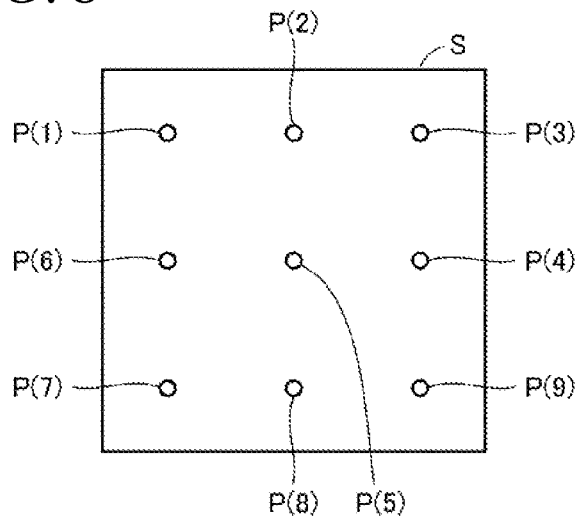
FIG. 8 is a plan view showing an example of a sample in which a plurality of measurement points is set.

A quantitative analysis may be performed at several points on a sample. FIG. 8 is a plan view showing an exemplary sample in which a plurality of measurement points is set. Referring to FIG. 8, each of points P(1) to P(9) on a sample S is a measurement point where a quantitative analysis is performed. Hereinafter, Embodiment 2 will be described with reference to this sample S.

In a case of performing the quantitative analysis at several measurement points P(1) to P(9), it is time-consuming and inefficient to perform the peak search for each measurement point and the intensity measurements on the detected peak wavelength. For this reason, it is conceivable to perform the quantitative analysis at each measurement point P(1) to P(9) by setting the spectral wavelength to the peak wavelength acquired in the standard sample or the peak wavelength determined at the initial measurement point (e.g., P(1)) of the unknown sample. However, in such a method, there is a possibility that the measuring error becomes large due to effects, such as, e.g., a shift of the wavelength depending on the reproducibility of the mechanical operation of the spectrometer and a shift of the wavelength depending on the chemical bonding state of the element.

As a more efficient way to perform the quantitative analysis at a plurality of points, it is also conceivable to omit the time for changing the spectral wavelength for each measurement point by changing the measurement points P(1) to P(9) in order to measure the intensity after setting the spectral wavelength to the target wavelength. However, although this method can avoid the effects of the wavelength shifts that depend on the reproducibility of the mechanical operation of the spectrometer, it cannot avoid the errors due to the peak wavelength inaccuracies to be determined in the peak search and the effects of the wavelength shifts that depend on the chemical bonding state of the element.

Therefore, in this Embodiment 2, in the first measurement point (for example, P(1)) of the standard sample or the standard unknown sample, the wavelength range where the true value of the peak wavelength may be present is narrowed down by considering the statistical fluctuation of the measured value, by the method described in the above-described Embodiment 1. Then, after setting the spectral wavelength to one of the long wavelength end, the short wavelength end, and the intermediate wavelength between them (e.g., the long wavelength end), the intensity measurement is performed while measurement point P(1) to P(9) are sequentially changed to acquire the measured value of each measurement points in the set spectral wavelength (the long wavelength end). Such an operation is also performed for each of the remaining two wavelengths (the intermediate wavelength and the short wavelength end), to sequentially acquire the measured value of each measurement point for each set spectral wavelength (the intermediate wavelength and the short wavelength end).

Thereafter, for each of the measurement points P(1) to P(9), a quadratic function passing through the three measured values measured at each of the three wavelengths is calculated, and the peak wavelength and the peak intensity are calculated from the calculated quadratic function. This eliminates the necessity to change the spectral wavelength or perform the peak search each time the measurement point is changed, which greatly reduces the measuring time.

The entire configuration of the EPMA 100 according to Embodiment 2 is the same as that of the EPMA 100 shown in FIG. 1. The entire flow of the procedure of the quantitative analysis using the EPMA 100 according to Embodiment 2 is the same as the flow shown in FIG. 5 and FIG. 6. Embodiment 2 differs from Embodiment 1 in the procedure of the peak search processing executed in Step S150 of FIG. 6.

Figure 9:
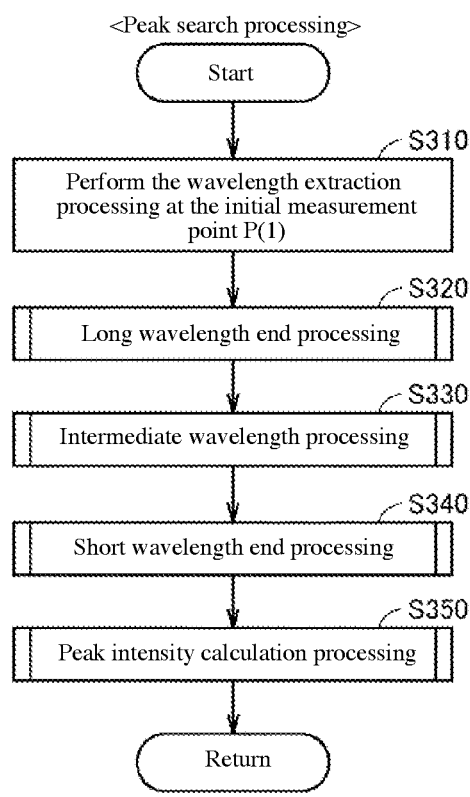
FIG. 9 is a flowchart showing an example of a procedure of the peak search processing in Embodiment 2.

FIG. 9 is a flowchart showing an exemplary procedure of the peak search processing in Embodiment 2. Referring to FIG. 9 together with FIG. 7 and FIG. 8, the data processing unit 11 executes the wavelength extraction processing shown in FIG. 7 at the first measurement point P(1) (Step S310). Thus, at the measurement point P (1), the wavelength range where the true peak intensity I may be present is narrowed down, and the intermediate wavelength at that wavelength range is calculated.

Next, the data processing unit 11 sets the measurement condition so that the intensity measurement is performed in the same counting time as the counting time (10 seconds) that the peak intensity measurement is performed at the long wavelength end (actually, the point on the long wavelength end side) of the narrowed wavelength range, and executes the long wavelength end processing (Step S320) to sequentially measure the intensity at each measurement point P (1) to P (9).

Subsequently, the data processing unit 11 sets the spectral wavelength to the intermediate wavelength calculated in the wavelength extracting processing, and executes the intermediate wavelength processing for sequentially measuring the intensity at each measurement point P(1) to P(9) under the same measurement condition (counting time 10 sec) as the long wavelength end processing (Step S330). Further, the data processing unit 11 sets the spectral wavelength to the short wavelength end (actually, the point on the short wavelength end side) of the narrowed wavelength range, and executes the short wavelength end processing for sequentially measuring the intensity at each measurement point P(1) to P(9) under the same measurement condition (counting time 10 sec) as the long wavelength end processing (Step S340).

Then, the data processing unit 11 performs the intermediate wavelength calculation processing for each of measurement point P(1) to P(9) to calculate the quadratic function passing through the three measured values calculated by the long wavelength end, the peak intensity processing, and the short wavelength end processing, and to calculate the peak wavelength and the peak intensity from the calculated quadratic function (Step S350).

Figure 10:
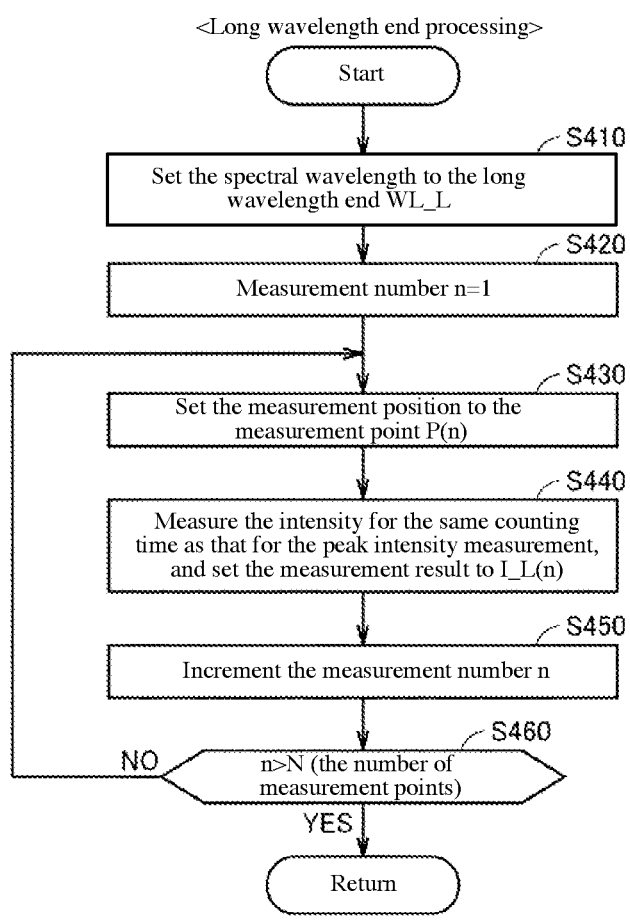
FIG. 10 is a flowchart showing an example of a procedure of the long wavelength end processing executed in Step S320 of FIG. 9.

FIG. 10 is a flowchart showing an exemplary procedure of the long wavelength end processing executed in Step S320 of FIG. 9. Referring to FIG. 10, the data processing unit 11 sets the spectral wavelength to the long wavelength end WL_L in the wavelength range (range where the true peak intensity I may be present) narrowed down by the wavelength extracting processing (Step S310 of FIG. 9) (Step S410). Note that, in practice, the spectral wavelength is set to the wavelength at the wavelength range point on the long wavelength end side.

Then, the data processing unit 11 sets the measurement point number n specifying the measurement point P(n) to "1" (Step S420), and sets the measured position on the sample S to the measurement point P(1) (Step S430). Next, the data processing unit 11 sets the measurement condition so that the intensity measurement is performed for the same counting time as the counting time (10 seconds) at the time of measuring the peak intensity, and sets the measurement result measured under this measurement condition as the measured value I_L(1) at the measurement point P (1) at the long wavelength end WL_L (Step S440).

Next, the data processing unit 11 increments the measurement point number n (Step S450), and determines whether or not the measurement point number n has exceeded the number of the measured points N (N=9 in the case of FIG. 8) (Step S460). When it is determined that the measurement point number n is equal to or less than N (NO in Step S460), the processing is returned to Step S430, and the following measurement point measurements are performed. When it is determined in Step S460 that the measurement point number n is larger than N (YES in Step S460), the processing is returned.

Figure 11:
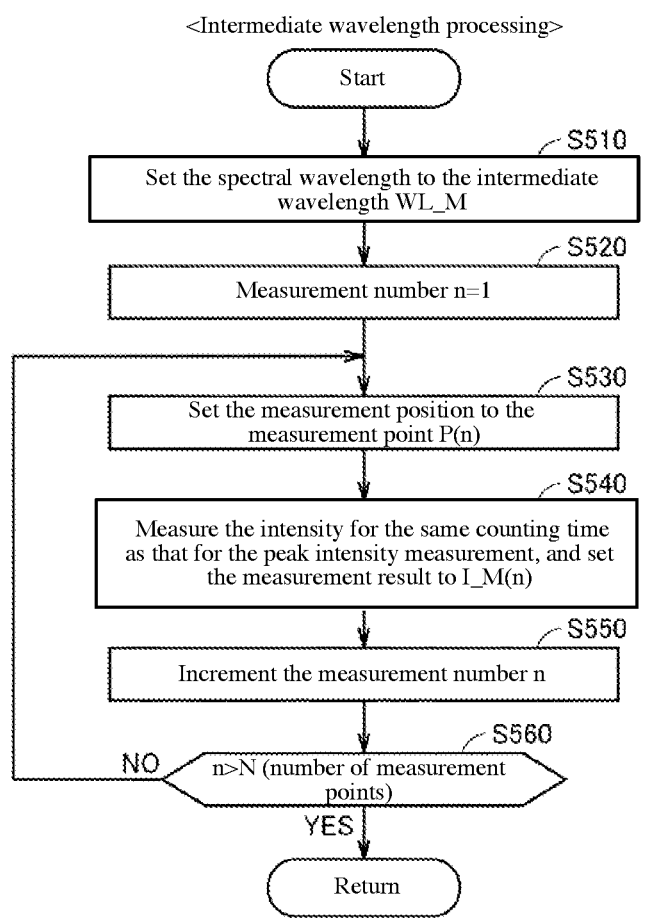
FIG. 11 is a flowchart showing an example of a procedure of the intermediate wavelength processing executed in Step S330 of FIG. 9.

FIG. 11 is a flowchart showing an exemplary procedure of the intermediate wavelength processing executed in Step S330 of FIG. 9. Referring to FIG. 11, the data processing unit 11 sets the spectral wavelength to the intermediate wavelength WL_M of the wavelength range (range where the true peak intensity I may be present) narrowed down by the wavelength extracting processing (Step S310 of FIG. 9) (Step S510). For example, the intermediate wavelength WL_M is a median value in the wavelength range narrowed by the wavelength Extract processing.

The data processing unit 11 sets the measurement point number n to "1" (Step S520) and sets the measured position on the sample S to the measurement point P(1) (Step S530). Next, the data processing unit 11 sets the measurement condition so that the intensity measurement is performed for the same counting time as the counting time (10 seconds) where the peak intensity is measured, and sets the measurement result measured under the measurement condition as the measured value I_M(1) at the measurement point P(1) in the intermediate wavelength WL_M (Step S540).

Next, the data processing unit 11 increments the measurement point number n (Step S550), and determines whether or not the measurement point number n has exceeded the number of the measured points N (Step S560). When it is determined that the measurement point number n is equal to or less than N (NO in Step S560), the processing is returned to Step S530, and the following measurement point measurements are performed. When it is determined in Step S560 that the measurement point number n is larger than N (YES in Step S560), the processing is shifted to the return.

Figure 12:
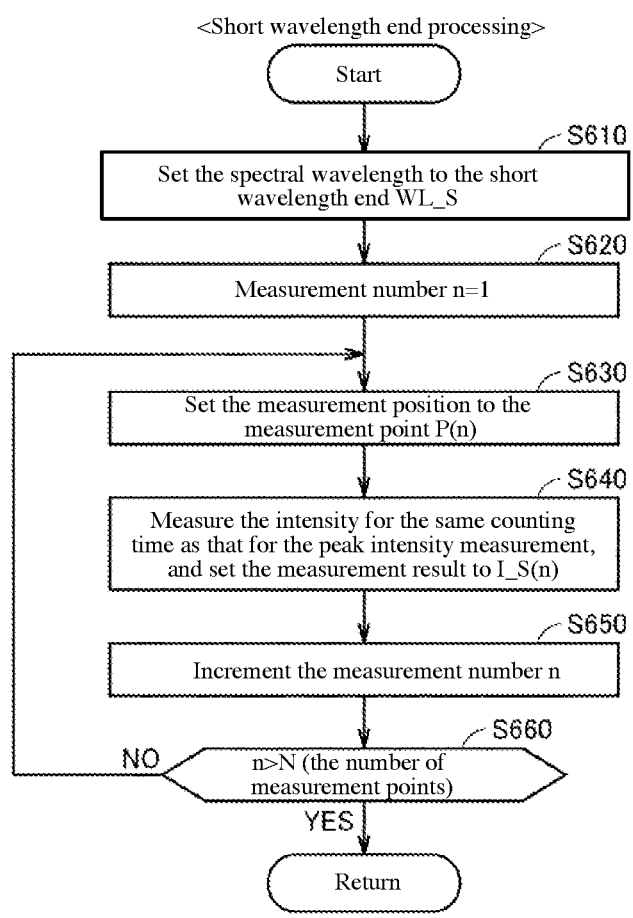
FIG. 12 is a flowchart showing an example of a procedure of the short wavelength end processing executed in Step S340 of FIG. 9.

FIG. 12 is a flowchart showing an exemplary procedure of the short wavelength end processing executed in Step S340 of FIG. 9. Referring to FIG. 12, the data processing unit 11 sets the spectral wavelength to the short wavelength end WL_S in the wavelength range (range where the true peak intensity I may be present) narrowed down by the wavelength extracting processing (Step S310 of FIG. 9) (Step S610).

Then, the data processing unit 11 sets the measurement point number n to "1" (Step S620) and sets the measured position on the sample S to the measurement point P(1) (Step S630). Next, the data processing unit 11 sets the measurement condition so that the intensity measurement is performed for the same counting time as the counting time (10 seconds) when the peak intensity is measured, and sets the measurement result measured under this measurement condition as the measured value I_S(1) at the measurement point P(1) at the short wavelength end WL_S (Step S640).

Next, the data processing unit 11 increments the measurement point number n (Step S650), and determines whether or not measurement point number n has exceeded the number of measured points N (Step S660). When it is determined that the measurement point number n is equal to or less than N (NO in Step S660), the processing is returned to Step S630, and the following measurement point measurements are performed. When it is determined in Step S660 that the measurement point number n is larger than N (YES in Step S660), the processing is returned.

Figure 13:
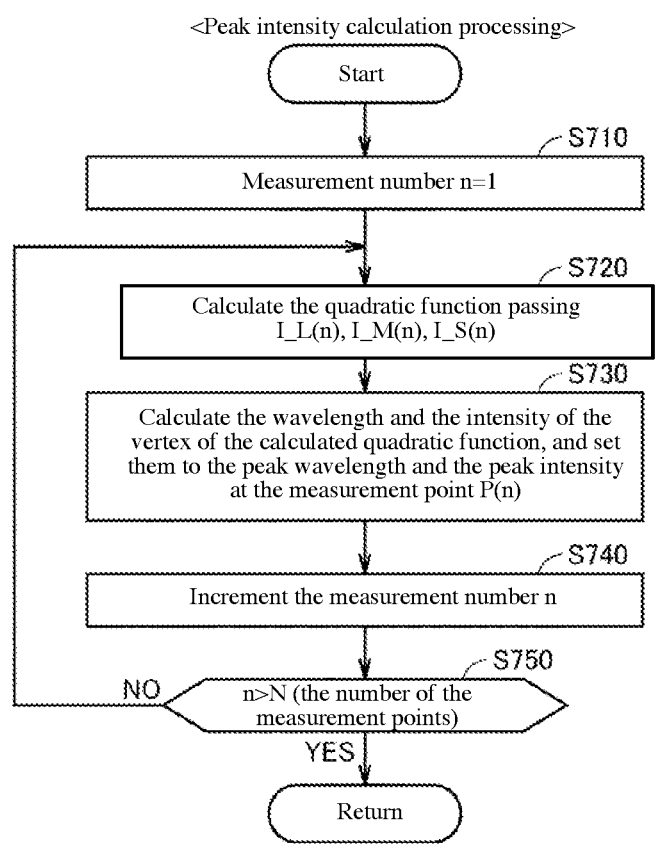
FIG. 13 is a flowchart showing an example of a procedure of the peak intensity calculation processing executed in Step S350 of FIG. 9.

FIG. 13 is a flowchart showing an exemplary procedure of the peak intensity calculation processing executed in Step S350 of FIG. 9. Referring to FIG. 13, first, the data processing unit 11 sets the measurement point number n specifying the measurement point P(n) to "1" (Step S710). Then, the data processing unit 11 calculates, for the measurement point P(1), the value quadratic function passing through the three measured values of the measured value I_L(1) calculated at the long wavelength end processing, the measured value I_M(1) calculated by the intermediate wavelength processing, and the measured value I_S(1) calculated by the short wavelength end processing (Step S720).

Next, the data processing unit 11 calculates the calculated wavelength of the vertex of the calculated quadratic function and the intensity at its wavelength, using the above-described formula (5), and sets the calculated wavelength and intensity as the peak wavelength and the peak intensity at the measurement point P (1), respectively (Step S730).

Next, the data processing unit 11 increments the measurement point number n (Step S740), and determines whether or not the measurement point number n has exceeded the number of the measured points N (Step S750). When it is determined that the measurement point number n is equal to or less than N (NO in Step S750), the processing is returned to Step S720, and the following measurement point measurements are performed. When it is determined in Step S750 that the measurement point number n is larger than N (YES in Step S750), the processing is returned.

As described above, according to Embodiment 2, there is no need to change the spectral wavelength or perform the peak search every time the measurement point P(1) to P(9) is changed, and the measuring time can be greatly shortened. In addition, since the X-ray wavelength is measured sequentially at several measurement points at the same spectral position (spectral wavelength), there is no variation in the measured value due to the effect of shifting of the spectrometer depending on the reproducibility of the mechanical operation, thus realizing highly reproducible measurement. Furthermore, even if there is a shift in the wavelength depending on the chemical bonding state of the element, the peak wavelength and the peak intensity can be acquired with high accuracy as long as the wavelength after the shift falls within the above-described wavelength range where the true value of the peak wavelength may be present.

Aspects

It would be understood by those skilled in the art that the plurality of exemplary embodiments described above and modifications thereof are specific examples of the following aspects.

(Item 1)

An X-ray analysis device according to a first aspect of the present disclosure is provided with a wavelength dispersive spectrometer, and a processing unit configured to perform peak search processing for detecting a peak wavelength of a spectrum of characteristic X-rays to be diffracted using a spectrometer. The peak search processing includes first to sixth processing. The first processing is processing for acquiring a profile of the spectrum by measuring the characteristic X-rays by a time (for example, 0.375 seconds) shorter than a counting time (for example 10 seconds) when measuring peak intensity of the characteristic X-rays, while actuating the spectrometer so that a wavelength of the characteristic X-rays changes at predetermined intervals. The second processing is processing for calculating a minimum value of a value that a true value of the peak intensity can take, from an intensity value of data indicating maximum intensity in the acquired profile and a statistical fluctuation of a measured value. The third processing is processing for calculating a minimum measured value that a measured value of the peak intensity can take by the statistical fluctuation of the measured value when the true value of the peak intensity is the minimum value. The fourth processing is processing for measuring the intensity of the characteristic X-rays for the counting time which is same as for measuring peak intensity, at the long and short end of the wavelength range in which the measured value in the acquired profile is larger than the minimum measured value, and at an intermediate wavelength between the long and short ends. The fifth processing is processing for calculating a quadratic function passing through each measured value of the long wavelength end, the short wavelength end, and the intermediate wavelength. The sixth processing is processing for calculating a wavelength of a vertex of the calculated quadratic function as the peak wavelength.

In the X-ray analysis device described in the above-described item 1, considering the statistical fluctuation of the measured value, the wavelength range where the true value of the peak intensity may be present is narrowed down. Thus, considering statistical the fluctuation of the measured value, it is possible to reasonably narrow down the wavelength range where the true value of the peak intensity may be present. Then, the intensity of the characteristic X-rays is measured at the long wavelength end and the short wavelength end of the narrowed-down wavelength range, and the intermediate wavelength between them, the peak wavelength is calculated from the quadratic function passing through the respective measurement points. As a result, a highly accurate peak search can be realized without significantly increasing the processing time.

(Item 2)

In the X-ray analysis device as recited in the above-described item 1, the intermediate wavelength may be a median value in the wavelength range.

With this, by using the long wavelength end and the short wavelength end of the above-described wavelength range, and the median value in the above-described wavelength range, it is possible to perform the highly accurate functional approximation.

(Item 3)

In the X-ray analysis device as recited in the above-described item 1 or 2, the processing unit may calculate the intensity of the vertex of the quadratic function as the peak intensity.

With this, it is not necessary to measure the peak intensity again at the calculated peak wavelength, and the measuring time can be shortened.

(Item 4)

In the X-ray analysis device as recited in the above-described item 1 or 2, the processing unit may measure the peak intensity for the counting time at the peak wavelength.

When the intensity of the vertex of the quadratic function is the peak intensity, there is a possibility that an error of functional approximation is included. However, according to the above-described configuration, it is possible to acquire the peak intensity with higher accuracy.

(Item 5)

In the X-ray analysis device as recited in any one of the above-described items 1 to 4, the processing unit may execute the first to third processing at an initial measurement point when a quantitative analysis is performed at a plurality of measurement points on a sample. The fourth processing may include processing for continuously measuring the intensity of the characteristic X-rays for the counting time sequentially at the plurality of measurement points at the long wavelength end, processing for continuously measuring the intensity of the characteristic X-rays for the counting time sequentially at the plurality of measurement points at the short wavelength end, and processing for continuously measuring the intensity of the characteristic X-rays for the counting time sequentially at the plurality of measurement points at the intermediate wavelength. The fifth processing may include processing for calculating a quadratic function passing through each measured value of the long wavelength end, the short wavelength end, and the intermediate wavelength for each of the plurality of measurement points. The sixth processing may include processing of calculating a wavelength of a vertex of the calculated quadratic function as the peak wavelength for each of the plurality of measurement points.

According to this X-ray analysis device, there is no need to change the spectral wavelength or perform the peak search each time the measurement point is changed, which greatly reduces the measuring time.

(Item 6)

A peak search method according to one aspect of the present disclosure is peak search method for detecting a peak wavelength of a spectrum of characteristic X-rays to be dispersed using a wavelength dispersive spectrometer, include a first step to a sixth step. The first step is a step of acquiring a profile of the spectrum by measuring the characteristic X-rays by a time (for example 0.375 seconds) shorter than a counting time (for example 10 seconds) when measuring peak intensity of the characteristic X-rays, while actuating the spectrometer so that a wavelength of the characteristic X-rays changes at predetermined intervals. The second step is a step of calculating a minimum value of a value that a true value of the peak intensity can take, from an intensity value of data indicating maximum intensity in the acquired profile and a statistical fluctuation of a measured value. The third step is a step of calculating a minimum measured value that a measured value of the peak intensity can take by the statistical fluctuation of the measured value when the true value of the peak intensity is the minimum value. The fourth step is a step of measuring the intensity of the characteristic X-rays for the counting time which is same as for measuring peak intensity, at the long and short end of the wavelength range in which the measured value in the acquired profile is larger than the minimum measured value, and at an intermediate wavelength between the long and short ends. The fifth step is a step of calculating a quadratic function passing through each measured value of the long wavelength end, the short wavelength end, and the intermediate wavelength. The sixth step is a step of calculating a wavelength of a vertex of the calculated quadratic function as a peak wavelength According to this peak search method, a highly accurate peak search can be realized without significantly increasing the processing time.

(Item 7)

In the peak search method as recited in the above-described item 6, the intermediate wavelength may be a median value in the wavelength range.

With this, using the long wavelength end and the short wavelength end in the above-described wavelength range, and the median value in the above-described wavelength range, it is possible to perform the highly accurate functional approximation.

(Item 8)

In the peak search method as recited in the above-described item 6 or 7, the sixth step may include a step of calculating the intensity of the vertex of the quadratic function as the peak intensity.

With this, it is not necessary to measure the peak intensity again in the calculated peak wavelength, and the measuring time can be shortened.

(Item 9)

In the peak search method as recited in the above-described item 6 or 7, the sixth step may include a step of measuring the peak intensity for the counting time in the peak wavelength.

When the intensity of the vertex of the quadratic function is the peak intensity, there is a possibility that an error of the function approximation is included. However, according to the above-described configuration, the peak intensity with higher accuracy can be acquired.

(Item 10)

In the peak search method as recited in any one of the above-described items 6 to 9, in a case where a quantitative analysis is performed at a plurality of measurement points on the sample, the fourth step may include a step of continuously measuring the intensity of the characteristic X-rays for the counting time sequentially at the plurality of measurement points at the long wavelength end, a step of continuously measuring the intensity of the characteristic X-rays for the counting time sequentially at the plurality of measurement points at the short wavelength end, and a step of continuously measuring the intensity of the characteristic X-rays for the counting time sequentially at the plurality of measurement points at the intermediate wavelength. The fifth step may include a step of calculating the quadratic function passing through each measured value of the long wavelength end in the above-described wavelength range, the short wavelength end in the above-described wavelength range, and intermediate wavelength for each of the plurality of measurement points. The sixth step may include a step of calculating a wavelength of the vertex of the calculated quadratic function as the peak wavelength for each of the plurality of measurement points.

According to this peak search method, it is unnecessary to change the spectral wavelength or perform the peak search every time the measurement point is changed, and the measuring time can be greatly shortened.

The embodiments disclosed herein are to be considered in all aspects as illustrative and not restrictive. The scope of the present invention is indicated by the claims rather than by the descriptions of the embodiments described above, and it is intended to include all modifications within the meanings and ranges equivalent to those of the claims.

DESCRIPTION OF SYMBOLS

1: Electron gun
2: Deflecting coil

3: Object lens
4: Sample stage
5: Sample stage drive unit
6a, 6b: Spectrometer
10: Control unit
11: Data processing unit
12: Deflecting coil control unit
13: Operation unit
14: Display unit
20: CPU
22: Memory
61a, 61b: Analyzing crystal
63a, 63b: Detector
64a, 64b: Slit
100: EPMA
S: Sample

The invention claimed is:

1. An X-ray analysis device comprising:
a wavelength dispersive spectrometer; and
a processing unit configured to perform peak search processing for detecting a peak wavelength of a spectrum of characteristic X-rays to be diffracted using a spectrometer,
wherein the peak search processing includes
first processing for acquiring a profile of the spectrum by measuring the characteristic X-rays by a time shorter than a counting time when measuring peak intensity of the characteristic X-rays, while actuating the spectrometer so that a wavelength of the characteristic X-rays changes at predetermined intervals,
second processing for calculating a minimum value of a value that a true value of the peak intensity can take, from an intensity value of data indicating maximum intensity in the acquired profile and a statistical fluctuation of a measured value,
third processing for calculating a minimum measured value that a measured value of the peak intensity can take by the statistical fluctuation of the measured value when the true value of the peak intensity is the minimum value,
fourth processing for measuring the intensity of the characteristic X-rays for the counting time which is same as for measuring peak intensity, at the long and short end of the wavelength range in which the measured value in the acquired profile is larger than the minimum measured value, and at an intermediate wavelength between the long and short ends,
fifth processing for calculating a quadratic function passing through each measured value of the long wavelength end, the short wavelength end, and the intermediate wavelength, and
sixth processing for calculating a wavelength of a vertex of the calculated quadratic function as the peak wavelength.

2. The X-ray analysis device as recited in claim 1,
wherein the intermediate wavelength is a median value in the wavelength range.

3. The X-ray analysis device as recited in claim 1,
wherein the processing unit calculates the intensity of the vertex of the quadratic function as the peak intensity.

4. The X-ray analysis device as recited in claim 1,
wherein the processing unit measures the peak intensity for the counting time at the peak wavelength.

5. The X-ray analysis device as recited in claim 1,
wherein the processing unit executes the first to third processing at an initial measurement point when a quantitative analysis is performed at a plurality of measurement points on a sample,
wherein the fourth processing includes
processing for continuously measuring the intensity of the characteristic X-rays for the counting time sequentially at the plurality of measurement points at the long wavelength end,
processing for continuously measuring the intensity of the characteristic X-rays for the counting time sequentially at the plurality of measurement points at the short wavelength end, and
processing for continuously measuring the intensity of the characteristic X-rays for the counting time sequentially at the plurality of measurement points at the intermediate wavelength,
wherein the fifth processing includes processing for calculating a quadratic function passing through each measured value of the long wavelength end, the short wavelength end, and the intermediate wavelength for each of the plurality of measurement points, and
wherein the sixth processing includes processing of calculating a wavelength of a vertex of the calculated quadratic function as the peak wavelength for each of the plurality of measurement points.

6. A peak search method for detecting a peak wavelength of a spectrum of characteristic X-rays to be dispersed using a wavelength dispersive spectrometer, the peak search method comprising:
a first step of acquiring a profile of the spectrum by measuring the characteristic X-rays by a time shorter than a counting time when measuring peak intensity of the characteristic X-rays, while actuating the spectrometer so that a wavelength of the characteristic X-rays changes at predetermined intervals:
a second step of calculating a minimum value of a value that a true value of the peak intensity can take, from an intensity value of data indicating maximum intensity in the acquired profile and a statistical fluctuation of a measured value;
a third step of calculating a minimum measured value that a measured value of the peak intensity can take by the statistical fluctuation of the measured value when the true value of the peak intensity is the minimum value;
a fourth step of measuring the intensity of the characteristic X-rays for the counting time which is same as for measuring peak intensity, at the long and short end of the wavelength range in which the measured value in the acquired profile is larger than the minimum measured value, and at an intermediate wavelength between the long and short ends;
a fifth step of calculating a quadratic function passing through each measured value of the long wavelength end, the short wavelength end, and the intermediate wavelength; and
a sixth step of calculating a wavelength of a vertex of the calculated quadratic function as the peak wavelength.

7. The peak search method as recited in claim 6,
wherein the intermediate wavelength is a median value in the wavelength range.

8. The peak search method as recited in claim 6,
wherein the sixth step includes a step of calculating the intensity of the vertex of the quadratic function as the peak intensity.

9. The peak search method as recited in claim 6,
wherein the sixth step includes a step of measuring the peak intensity for the counting time in the peak wavelength.

10. The peak search method as recited in claim 6,
wherein in a case where a quantitative analysis is performed at a plurality of measurement points on the sample,
the fourth step includes
a step of continuously measuring the intensity of the characteristic X-rays for the counting time sequentially at the plurality of measurement points at the long wavelength end,
a step of continuously measuring the intensity of the characteristic X-rays for the counting time sequentially at the plurality of measurement points at the short wavelength end, and
a step of continuously measuring the intensity of the characteristic X-rays for the counting time sequentially at the plurality of measurement points at the intermediate wavelength,
wherein the fifth step includes a step of calculating the quadratic function passing through each measured value of the long wavelength end, the short wavelength end, and intermediate wavelength for each of the plurality of measurement points, and
wherein the sixth step includes a step of calculating a wavelength of the vertex of the calculated quadratic function as the peak wavelength for each of the plurality of measurement points.

* * * * *